Figure 1:
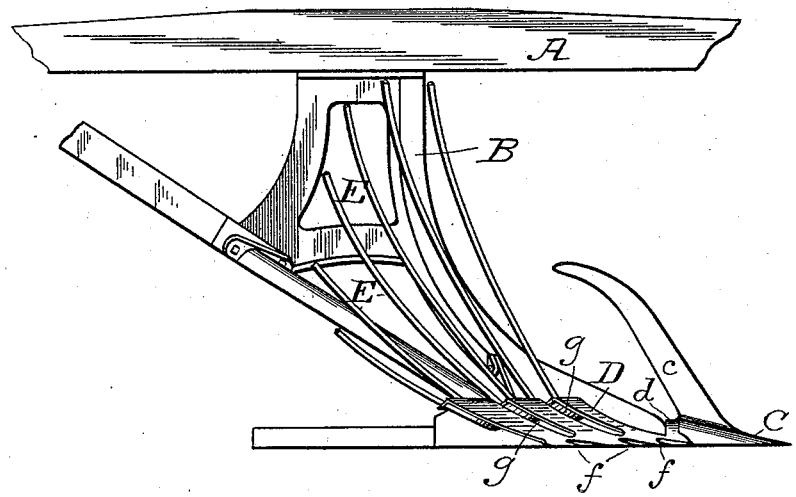

(No Model.)

J. E. & E. M. MITCHELL.
PLOW.

No. 485,394. Patented Nov. 1, 1892.

Witnesses.
Wm. M. Rheem.
A. A. Hall.

Inventors:
John E. Mitchell &
Elma M. Mitchell
By F. D. Thomason
Atty.

UNITED STATES PATENT OFFICE.

JOHN E. MITCHELL AND ELMA M. MITCHELL, OF SALEM, IOWA.

PLOW.

SPECIFICATION forming part of Letters Patent No. 485,394, dated November 1, 1892.

Application filed October 21, 1891. Serial No. 409,425. (No model.)

*To all whom it may concern:*

Be it known that we, JOHN E. MITCHELL and ELMA M. MITCHELL, both residents of Salem, in the county of Henry and State of Iowa, have invented certain new and useful Improvements in Plows, of which the following is a full, clear, and exact description, reference being had to the accompanying drawings and to the letters of reference marked thereon.

The plow-point of a plow is obviously made for the purpose of making the initial cut or entrance into the soil, and the sharper the point the less draft required to advance it. In some cases, however, the inherent resistant character of the soil makes it almost impossible, and therefore impractical, to keep the plowshare below the surface. Now the object of our invention is to make a light strong durable plow by substituting a series of bars suitably arranged and curved in the place of the original mold-board and the plowshare of which, instead of being confined to one point, has, so far as the result is concerned, several subordinate plow-points, which, besides making it a great deal easier to cut into the soil, greatly contributes to keep the share running steady at the depth desired, substantially as described, and as illustrated in the drawings, in which—

Figure 2:
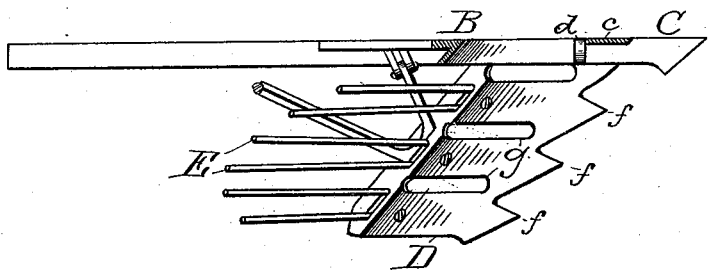
Figure 3:
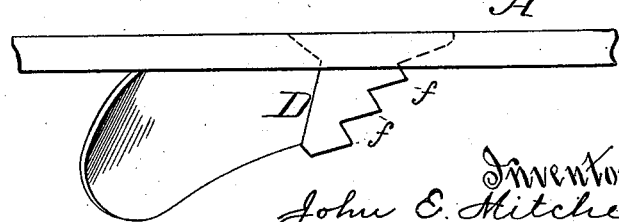

Figure 1 is a side view of our improved plow. Fig. 2 is a plan view of the same. Fig. 3 is a plan view of a modified form thereof.

In the drawings, A represents the beam of our improved plow.

B represents the standard thereof, the forward edge of which is properly curved and sharpened, so as to assist in separating the furrow from the landside, and C represents a movable plow-point having a colter $c$ arising therefrom, as shown.

D represents our improved plowshare. This plowshare is secured to the toe of the standard by means of an eye $d$, which surrounds the same between the plow-point and the standard proper, and, if desired, is prevented from having any independent movement therein by means of a sunken screw tapped into the toe of said standard. It is, like other plowshares, arranged so as to be oblique to the line of draft, but, unlike the others, extends back but a short distance from its cutting-edge, where it is provided with a mold-board consisting of a series of independent mold-bars E, the forward ends of which are suitably secured in the rear edge of the share and preferably under the same and have their rear stretch suitably curved or otherwise disposed of, so as to form a suitable mold-bar. We do not herein, however, desire to lay any claim to the combination of a plow-share and mold-board consisting of mold-bars as thus described, for both said bars and share and the manner of their connecting with each other are made the subject-matter of an application for Letters Patent of the United States filed by us August 28, 1891, Serial No. 404,004. What we do confine ourselves to, however, is the providing of the cutting-edge of the plowshare with one or more forwardly-projecting points or teeth or serrations $ff$, either cast in one piece with said share or removably secured to the cutting-edge thereof. It will be observed by referring to the drawings that we have provided the plowshare with three such forwardly-projecting points. This would be best in some soils, whereas in others where it is not intended to make the furrow so wide or the soil is more manageable one point would answer. We desire it to be understood when referring to the plowshare having points, serrations, or teeth that such projecting point or points, teeth, or serrations are to be considered aside from the regular plow-point C. Where we use two or more of these projections $f$, we prefer to make in the plowshare the longitudinal slot $g$, arranged so as to be in alignment with a longitudinal plane cutting between said points. This is done more for the sake of reducing its weight and does not materially affect the result sought to be accomplished by the use of the points, teeth, or serrations before referred to. These projecting points, teeth, or serrations would perform their function just as well whether the share-blade and mold-board were constructed like that hereinbefore described or were made solid, as shown in Fig. 3, after the fashion of the plows now in extensive use. However, a plow-share whose cutting-edge is provided with these points, teeth, or serrations and has the longitudinal slots therein and is also provided with a mold-board consisting of bars suitably disposed so as to form a mold-bar will be a very light, strong, and cheap plowshare and mold-board, possessing all the advantages of such a combination, and it is believed would be superior to anything now existing in that line.

What we claim as new is—

1. A plowshare the mold-board of which consists of a series of bars suitably disposed and which has a continuous cutting-edge that is provided with two or more projecting points.

2. A plowshare with longitudinal openings therein, having a continuous cutting-edge provided with longitudinal projecting points, and provided with a mold-board consisting of a series of bars suitably disposed, as set forth.

JOHN E. MITCHELL.
ELMA M. MITCHELL.

Witnesses:
ELIZA A. LEWIS,
E. O. AUSTIN,
FRANK D. THOMASON.